United States Patent [19]

Usher et al.

[11] Patent Number: 5,915,750
[45] Date of Patent: Jun. 29, 1999

[54] METHOD OF MANUFACTURING STATOR AND ROTOR CORES

[75] Inventors: Michael J. Usher, Fort Wayne, Ind.; John H. Boyd, Jr., Holland, Mich.; Delno C. Abnet; Peter Sell, both of Fort Wayne, Ind.

[73] Assignee: General Electric Company, Schenectady, N.Y.

[21] Appl. No.: 08/802,119

[22] Filed: Feb. 19, 1997

Related U.S. Application Data

[63] Continuation-in-part of application No. 08/139,578, Oct. 20, 1993.

[51] Int. Cl.$^6$ .................................................. H02K 15/02
[52] U.S. Cl. ..................... 29/596; 29/564.1; 29/564.6; 29/609; 83/41
[58] Field of Search ............................. 29/596, 609, 732, 29/564.1, 564.6; 83/41

[56] References Cited

U.S. PATENT DOCUMENTS

| | | | |
|---|---|---|---|
| 1,954,349 | 4/1934 | Dewey et al. | 164/49 |
| 2,308,277 | 1/1943 | Gillen | 164/18 |
| 2,352,118 | 6/1944 | Poupitch | 10/73 |
| 2,458,538 | 1/1949 | Socke | 164/18 |
| 2,690,802 | 10/1954 | Russell | 164/12 |
| 2,752,997 | 7/1956 | Soave | 164/15 |
| 2,867,824 | 1/1959 | O'Connor | 10/86 |
| 2,984,176 | 5/1961 | Sommer et al. | 100/295 |
| 3,101,639 | 8/1963 | Cederleaf | 83/698 |
| 3,107,566 | 10/1963 | Archer | 83/33 |
| 3,113,741 | 12/1963 | Herr | 242/56.8 |
| 3,175,438 | 3/1965 | Johnson | 83/13 |
| 3,283,982 | 11/1966 | Haskin, Jr. | 226/195 |
| 3,327,575 | 6/1967 | Duffee et al. | 83/13 |
| 3,393,635 | 7/1968 | Richardson | 100/43 |
| 3,460,415 | 8/1969 | Philipp | 83/27 |
| 3,527,132 | 9/1970 | Creffield | 83/698 |
| 3,610,021 | 10/1971 | Hopper | 72/446 |
| 3,650,167 | 3/1972 | Hoffmeyer et al. | 83/41 |
| 3,715,943 | 2/1973 | Hirai et al. | 83/50 |
| 3,719,802 | 3/1973 | Boyer | 235/61.11 R |
| 3,738,569 | 6/1973 | Killaly, Sr. | 234/43 |
| 3,752,028 | 8/1973 | Waizmann et al. | 83/685 |
| 3,771,613 | 11/1973 | Forster et al. | 177/60 |
| 3,841,216 | 10/1974 | Huffman | 101/181 |
| 3,854,355 | 12/1974 | Anefall | 83/50 |
| 3,858,432 | 1/1975 | Voorhees et al. | 72/455 |
| 3,991,350 | 11/1976 | Miyagoshi | 318/85 |
| 4,096,563 | 6/1978 | Slawson | 364/107 |
| 4,112,493 | 9/1978 | Roch et al. | 364/476 |
| 4,153,218 | 5/1979 | Martin | 242/75.3 |
| 4,238,718 | 12/1980 | Wepner et al. | 318/626 |
| 4,378,592 | 3/1983 | Helberger et al. | 364/476 |

(List continued on next page.)

FOREIGN PATENT DOCUMENTS

| | | | |
|---|---|---|---|
| 58-66557 | 4/1983 | Japan | 29/609 |
| 5-56607 | 3/1993 | Japan | 29/609 |
| 5-56608 | 3/1993 | Japan | 29/609 |
| 6-189509 | 7/1994 | Japan | 29/609 |

OTHER PUBLICATIONS

Minster Machine Company, R & D Report, Sep. 1975.

*Primary Examiner*—Carl E. Hall
*Attorney, Agent, or Firm*—Senniger, Powers, Leavitt & Roedel; Wayne O. Traynham

[57] ABSTRACT

A tandem press system for the high speed manufacture of rotor cores and stator cores of electric motors. The tandem press system includes a rotor press and a stator press arranged in series for stamping out laminations from a web of stock material and pre-assembling them into rotor cores and stator cores, respectively. Structure is provided between the rotor and stator press to maintain control of the web and provide a substantial barrier to transmission of vibrations in the web to the stator press. The rotor and stator presses are capable of shifting from stamping one type of lamination to stamping another type of lamination without any interruption in the operation of the presses.

6 Claims, 9 Drawing Sheets

U.S. PATENT DOCUMENTS

| | | | |
|---|---|---|---|
| 4,395,815 | 8/1983 | Stanley et al. | 29/598 |
| 4,408,281 | 10/1983 | Tack, Jr. et al. | 364/476 |
| 4,480,782 | 11/1984 | Morishima | 234/98 |
| 4,619,028 | 10/1986 | Neuenschwander | 29/33 L |
| 4,623,089 | 11/1986 | Scott | 234/114 |
| 4,650,114 | 3/1987 | Salvagnini | 234/114 |
| 4,698,991 | 10/1987 | Kirii et al. | 62/21 |
| 4,738,020 | 4/1988 | Neuenschwander | 29/598 |
| 4,797,831 | 1/1989 | Dressing et al. | 364/474.07 |
| 4,993,290 | 2/1991 | Obradovic | 83/32 |
| 5,044,237 | 9/1991 | Frame | 83/41 |
| 5,087,849 | 2/1992 | Neuenschwander | 310/216 |
| 5,123,155 | 6/1992 | Neuenschwander | 29/596 |
| 5,123,271 | 6/1992 | Sofy et al. | 72/336 |
| 5,140,879 | 8/1992 | Haj-Ali-Ahmadi | 83/39 |
| 5,241,138 | 8/1993 | Neuenschwander | 177/50 |

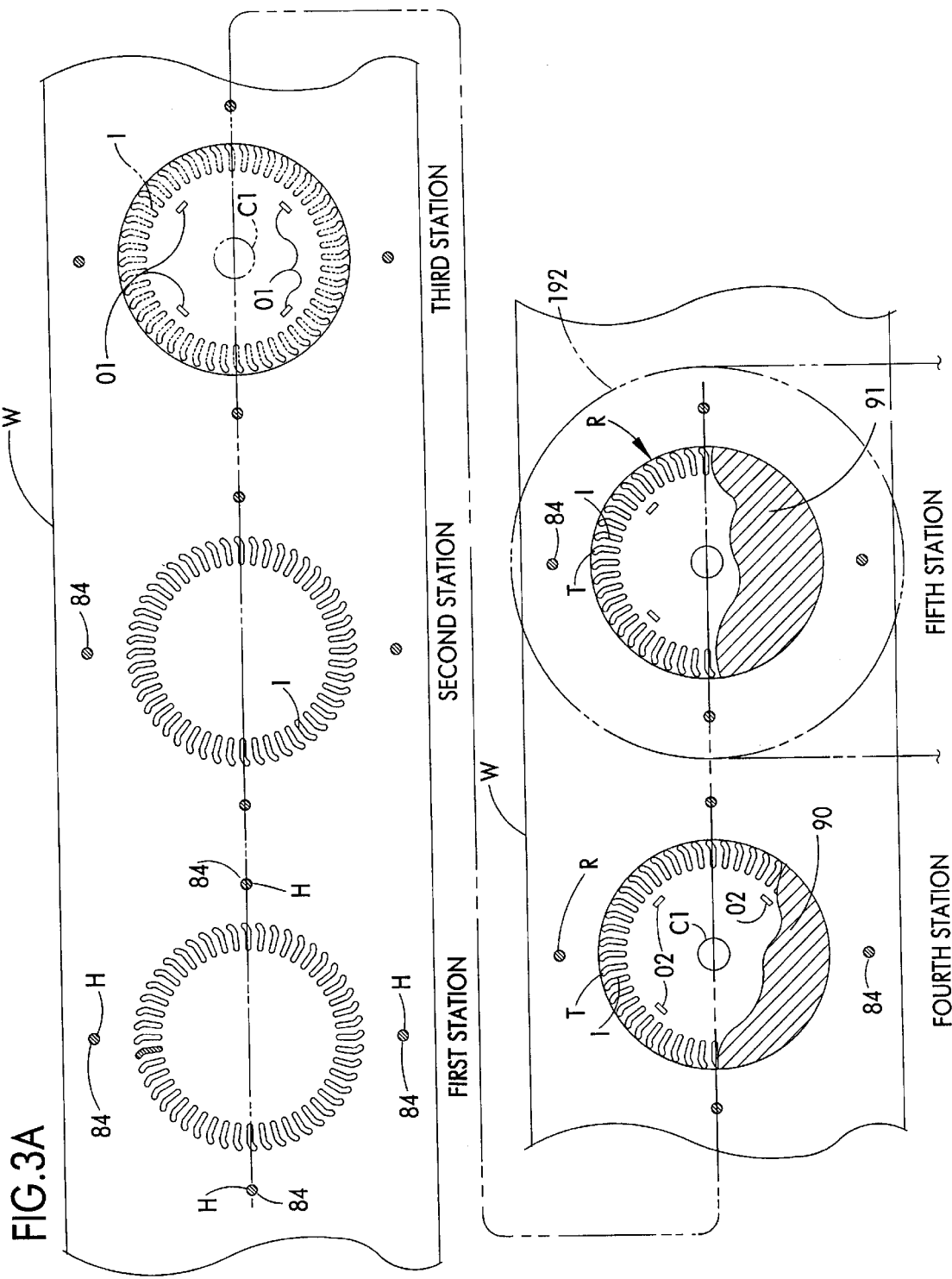

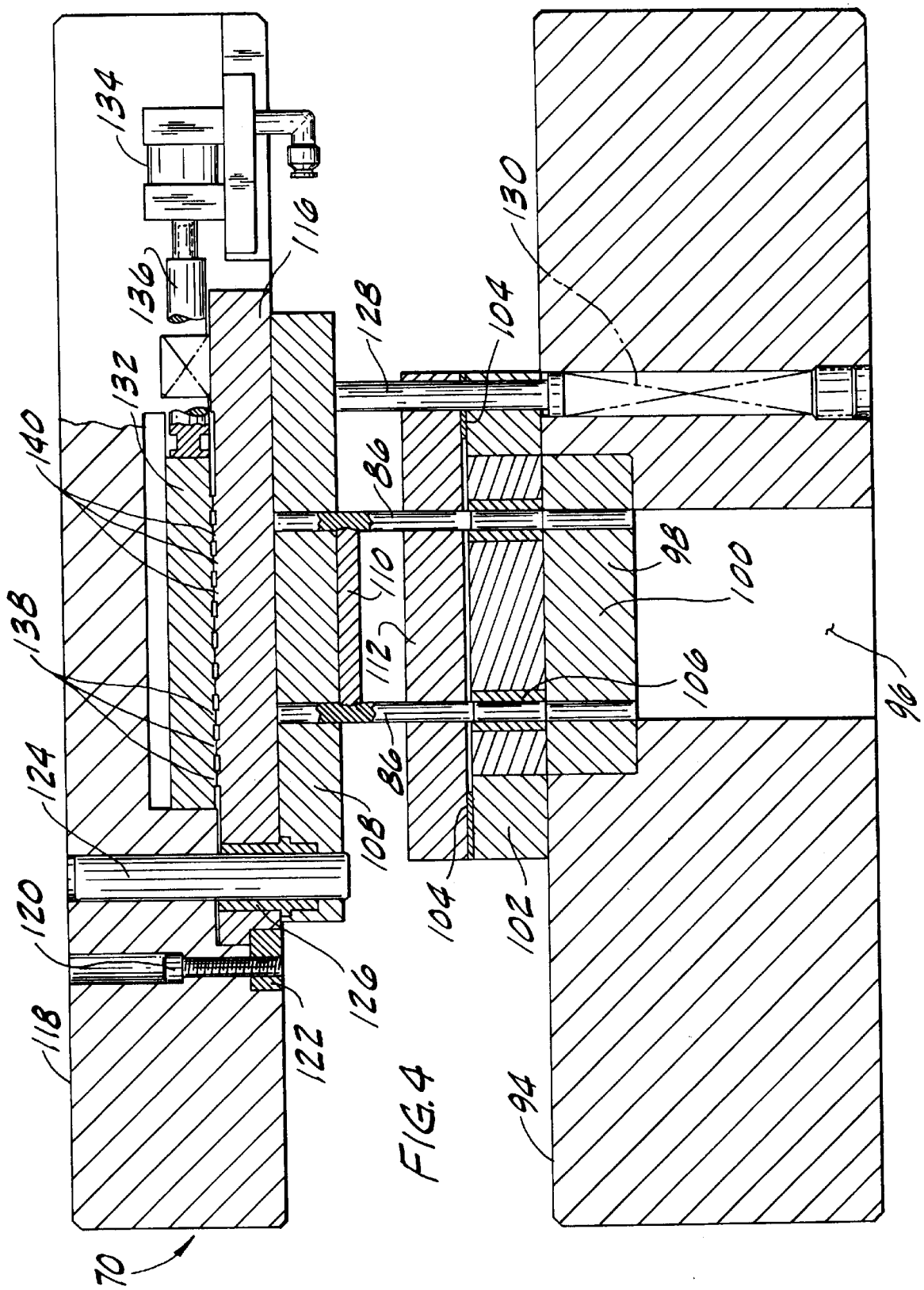

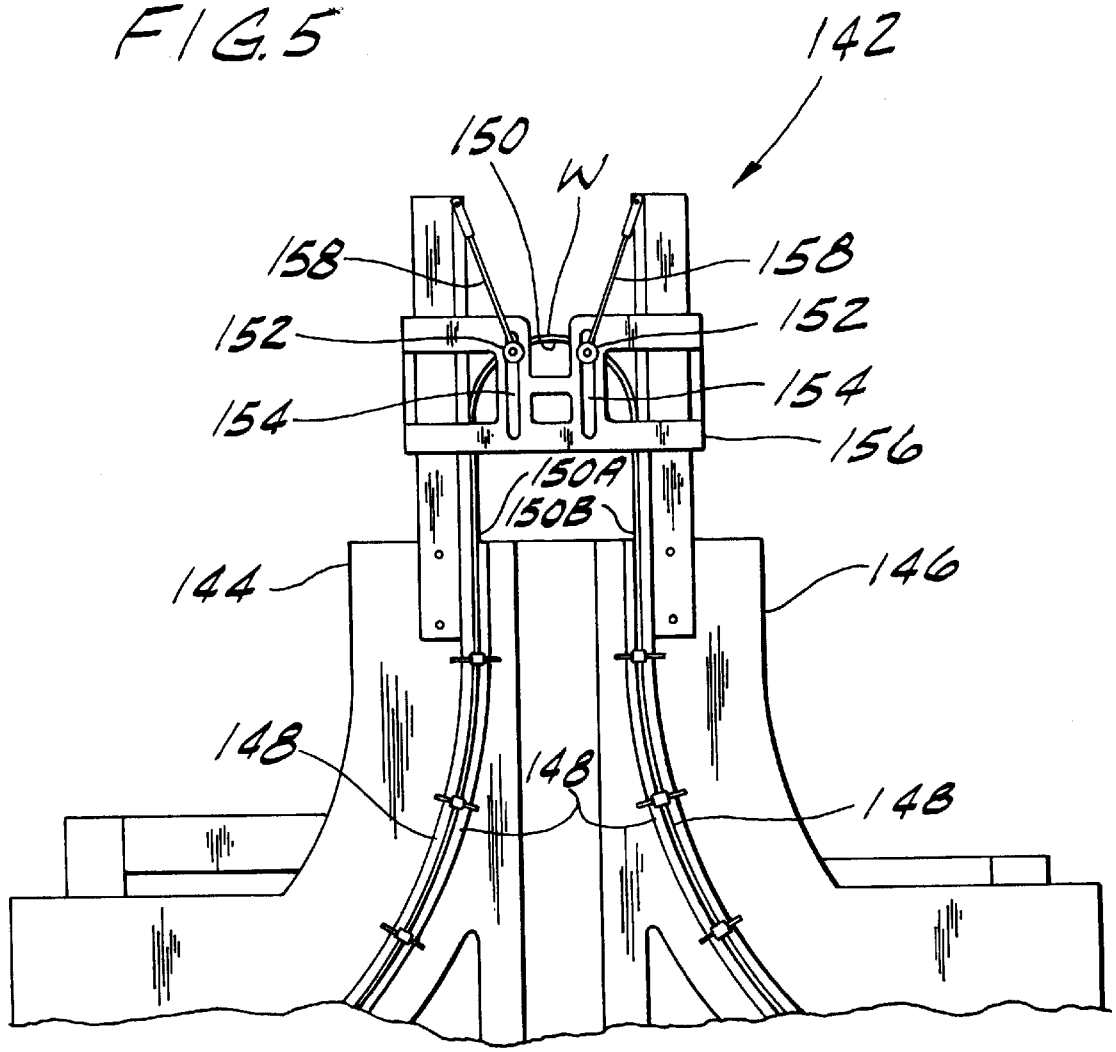

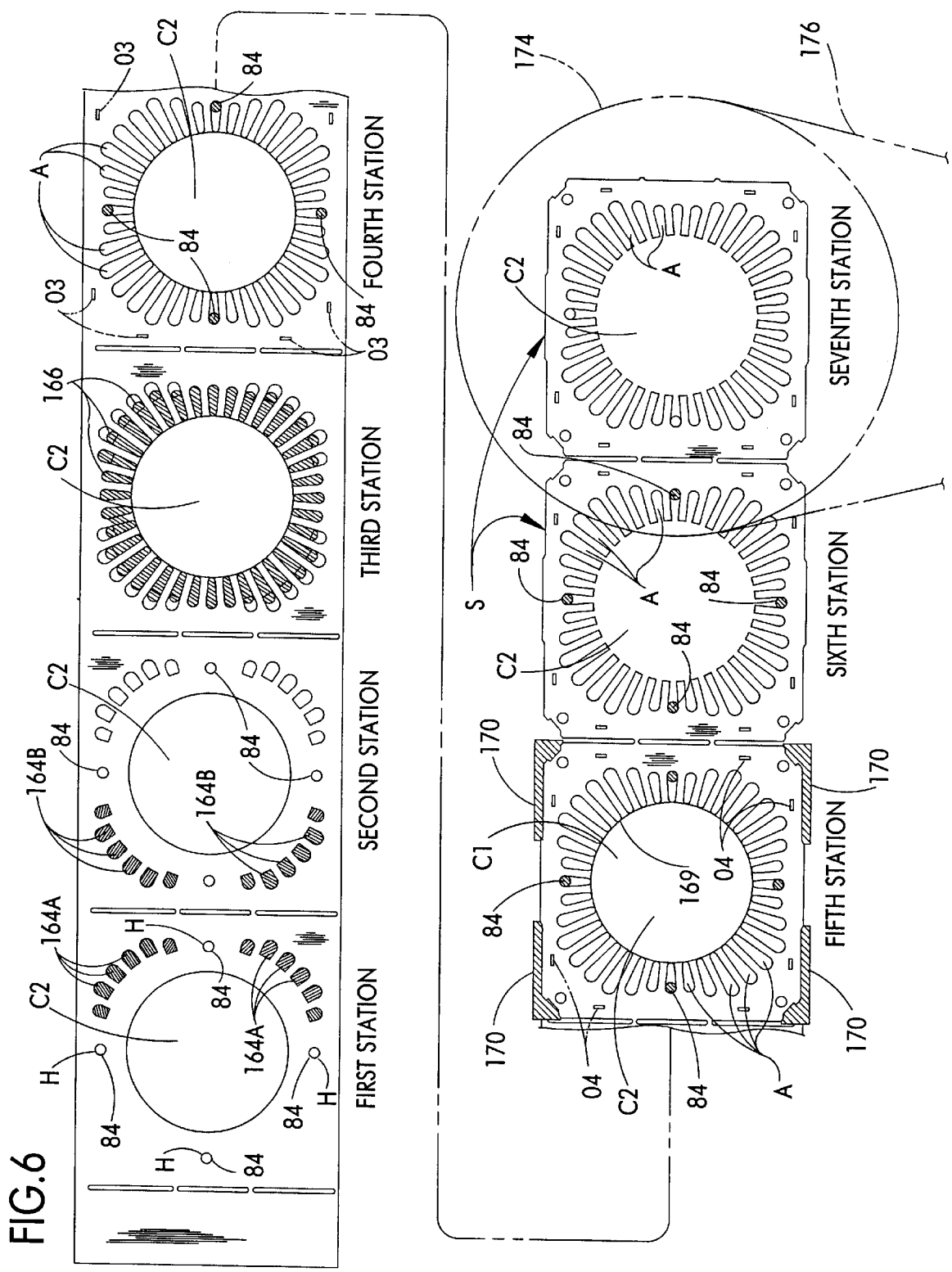

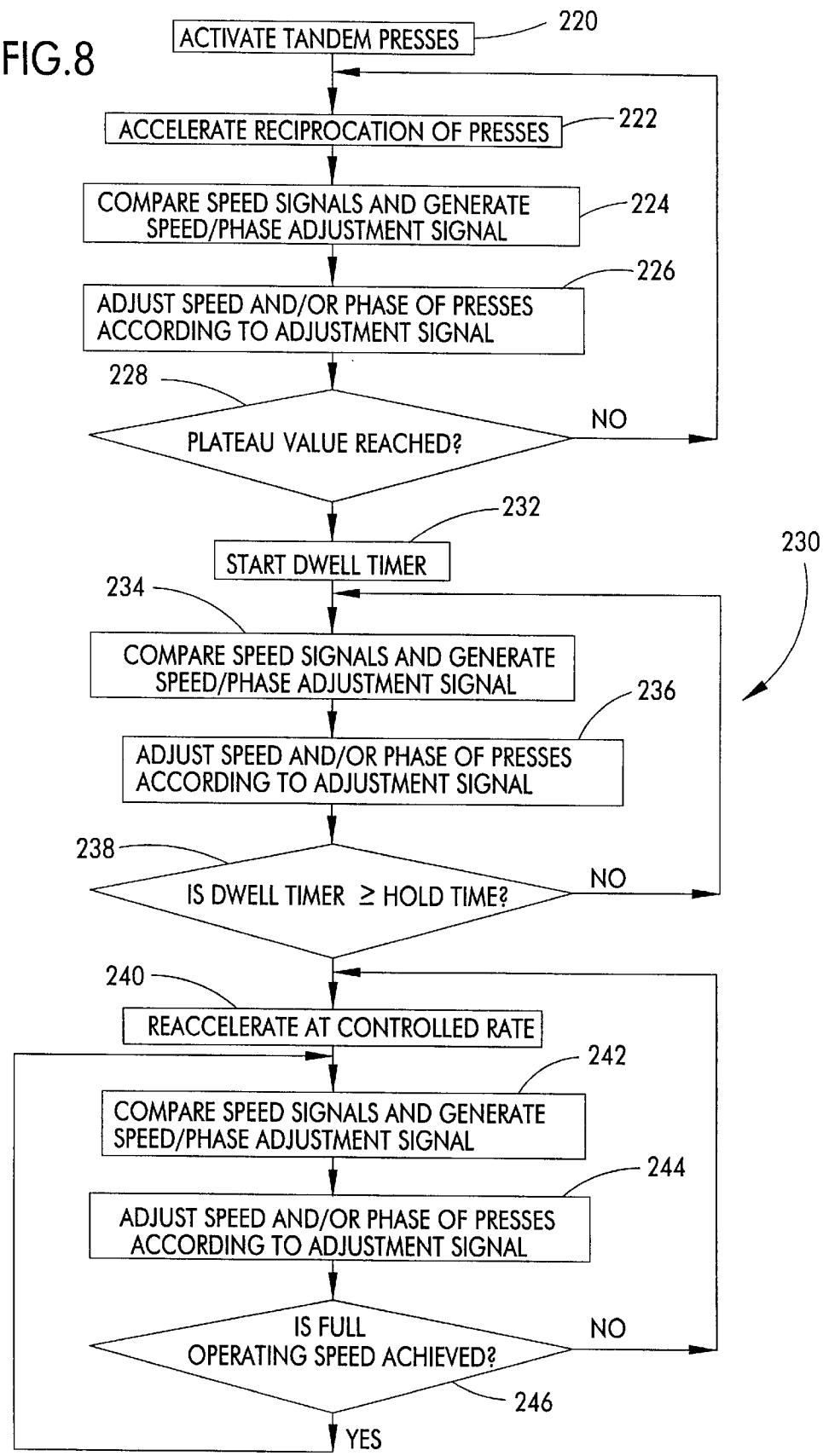

METHOD OF MANUFACTURING STATOR AND ROTOR CORES

This application is a division of application Ser. No. 08/337,626, filed Nov. 10, 1994, now U.S. Pat. No. 5,636,432, which is a continuation-in-part application of Ser. No. 08/139,578, filed Oct. 20, 1993.

BACKGROUND OF THE INVENTION

This invention relates generally to tandem press systems and more specifically to a tandem press system for high speed, flexible manufacture of stator and rotor cores of a dynamoelectric machine.

Competitive mass production of dynamoelectric machines in the form of electric motors, such as those used in household appliances and other machines, requires in the manufacture of the motor an emphasis on speed and continuity of operation. Production of stator and rotor cores of the motors has been carried out in a tandem press arrangement in which a web of highly magnetically permeable stock material is fed to a first (rotor) press and then to a second (stator) press. The rotor press punches out rotor laminations and stacks them in groups to form a rotor core. Similarly, the stator press punches out stator laminations around a central opening left by formation of rotor laminations, and stacks the stator laminations into groups to form a stator core.

Among the obstacles to rapid operation is the introduction of substantial vibrations to the web by virtue of the rapid impact and release of upper die portions of the presses with the web and, in particular, the rapid, intermittent feeding of the web. The vibrations make it difficult to maintain control of the web to the degree necessary to prevent misfeed and accurately punch the web. The problem is particularly acute at the stator press because the web is weakened by removal of material to form rotor laminations in the rotor press. The weakened web bends more easily and tends to become hung up in the stator die.

Continuity of operation is interrupted by the need to connect stock material from a new roll to the web as one roll is used up. Furthermore, to manufacture stator cores for one speed and multiple speed motors, either two separate press systems must be employed, or the stator die must be replaced. Replacement of a die requires a substantial amount of down time for the press.

SUMMARY OF THE INVENTION

Among the several objects and features of the present invention may be noted the provision of a tandem press system in which one of the presses is substantially isolated from vibrations caused by high speed operation of the other press; the provision of such a tandem press system which protects the stock material from damage caused by vibration; the provision of such a tandem press system which is capable of shifting during operation from stamping rotor or stator laminations of one type to stamping rotor or stator laminations of another type; and the provision of such a tandem press which is capable of consistently and continuously producing at high speeds rotor core and stator cores meeting close tolerances.

Generally, a tandem press system for the high speed manufacture of rotor cores and stator cores of dynamoelectric machines includes a rotor press for stamping rotor laminations from a web of stock material and stacking groups of laminations to form rotor cores, and a stator press for progressively stamping stator laminations from the remaining stock material in the web after the web leaves the rotor press and stacking groups of stator laminations to form stator cores. The stator press is capable of shifting without pause in operation from stamping stator laminations for one speed motors to stator laminations for two speed motors. The shifting between stamping stator laminations for one speed motors and stamping stator laminations for two speed motors is controlled by a controller.

Other objects and features of the present invention will be in part apparent and in part pointed out hereinafter.

BRIEF DESCRIPTION OF THE DRAWINGS

FIG. 3A is a schematic illustration of the progression of formation of rotor laminations of a first configuration in the rotor press;

FIG. 4 is a partial transverse section of a die set of the rotor press showing a movable reaction surface of an upper die portion of the die set;

FIG. 5 is an enlarged, fragmentary elevation of holding apparatus located between the rotor press and stator press;

FIG. 6 is a schematic illustration of the progression of formation of stator laminations in the stator press;

FIG. 8 is a flow chart showing operation of a tandem press controller upon start up of the tandem press system.

Corresponding reference characters indicate corresponding parts throughout the several views of the drawings.

DETAILED DESCRIPTION OF THE PREFERRED EMBODIMENT

Figure 1:
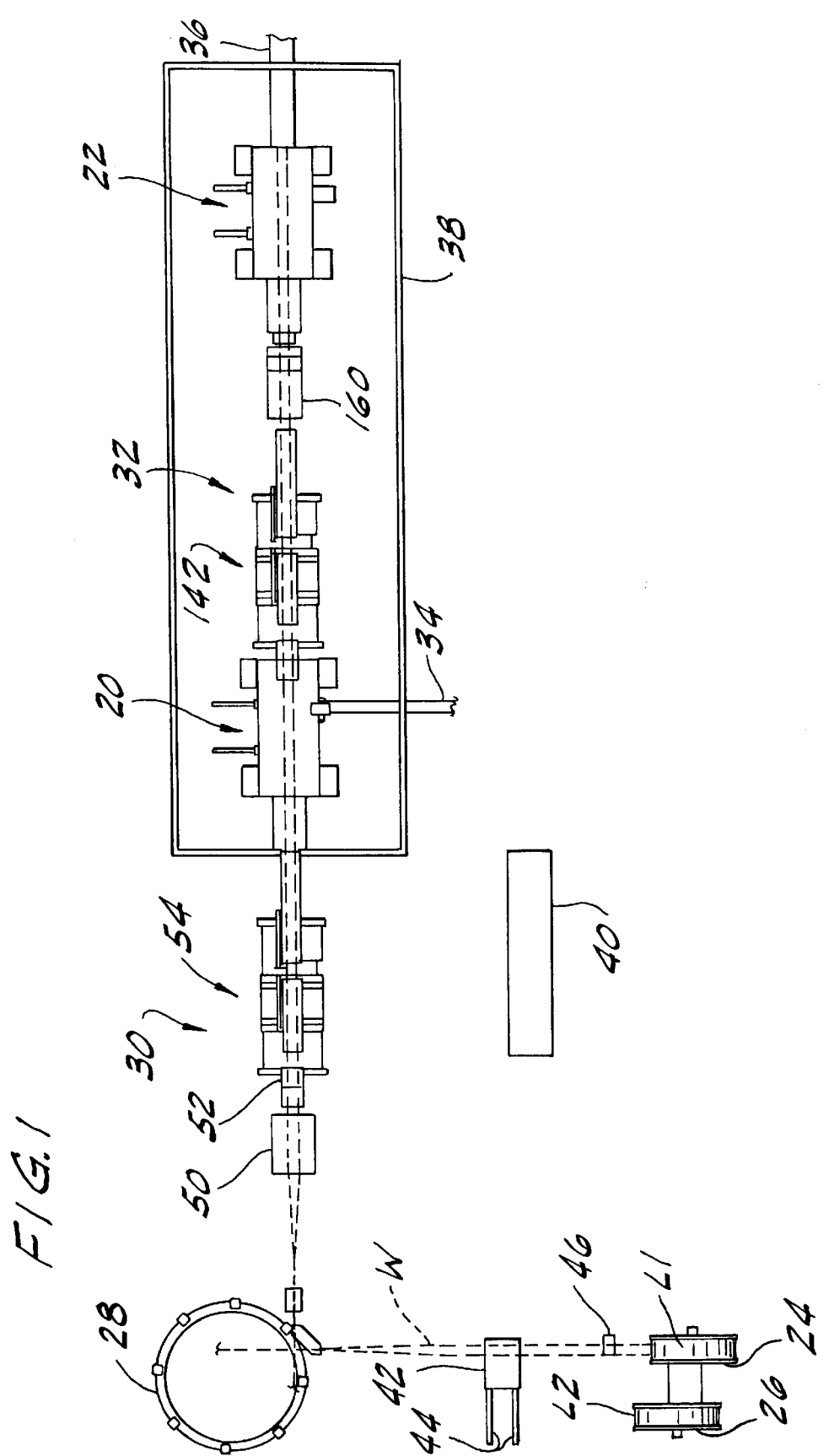
FIG. 1 is a schematic plan view of a tandem press system of the present invention including a rotor press and a stator press.
Figure 2:
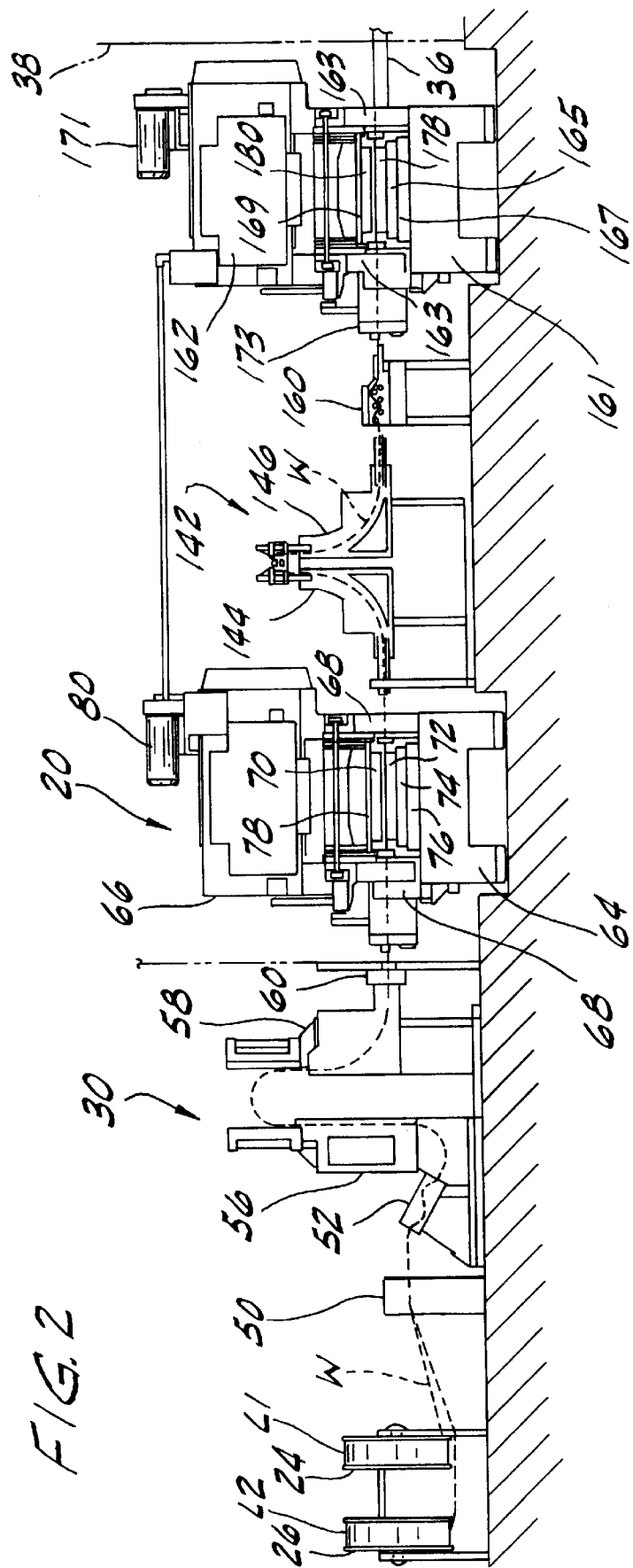
FIG. 2 is a schematic elevation of the tandem press system.

Referring now to the drawings and in particular to FIGS. 1 and 2, a tandem press system of the present invention is shown to comprise a rotor press (indicated generally at 20) for stamping rotor laminations R (FIG. 3A) from a web W of highly magnetically permeable stock material and a stator press (indicated generally at 22) for stamping stator laminations S (FIG. 6) from the web. In the preferred embodiment, the stock material is a low carbon, low silicon cold-rolled steel, having a maximum carbon content of 0.01%, a maximum silicon content of 0.5% and a maximum aluminum content of 0.25%. The nominal thickness of the stock material is nominally 0.022 inches. It is to be understood that the composition and geometry of the stock material may be other than described and still fall within the scope of this invention. A roll L1 of the thin, flat stock material is held by a first reel 24 at the beginning of the tandem press line and let out from the reel in the continuous web W through the tandem press system along the path indicated by dashed lines in FIG. 1. A second reel 26 carrying a second roll L2 of stock material is provided to facilitate rapid changeover when the roll L1 of material on the first reel 24 is exhausted. The web W extends from the first reel 24 to an accumulator 28 which is capable of receiving and accumulating a quantity of stock material from the first reel and letting out the stock material to first web control means, generally indicated at 30, and thence to the rotor press 20. In the preferred embodiment, the accumulator is model SCA-7 manufactured by Guild International of Bedford, Ohio. The web W passes from the rotor press 20 through second web control means, generally indicated at 32, and to the stator press 22.

The rotor press 20 stamps out rotor laminations R and stacks them to form rotor cores (not shown) which are ejected from the side of the rotor press onto a rotor core conveyor 34. The rotor laminations R having outer diameters of 3.46 inches (nominally) and inner diameter of 0.5004 to 0.5009. The stator press 22 stamps out stator laminations S and stacks them to form stator cores (not shown) which exit the end of the stator press onto a stator core conveyor 36. The stator laminations S are nominally 5.76 inches square and have an inner diameter of nominally 3.480. The dimensions of the rotor and stator laminations R, S may be other than stated herein and still fall within the scope of the present invention. The rotor and stator presses 20, 22 are housed in an enclosure 38 which isolates the noise of operation. The operation of the tandem press system is controlled from a control console which at least partially houses the tandem press system controller 40. The controller 40 may be a single controller or may embody a control circuit for the stator and rotor presses 20, 22 and another circuit for the die sets (described below) within the presses.

A welder 42 movably mounted on rails 44 is disposed between the first reel 24 of stock material and the accumulator 28 for connecting the end of one roll L1 of stock material to the beginning of another roll L2 of stock material. An end of roll detector 46 between the welder 42 and the first reel 24 detects the end of the stock material roll L1, and causes the accumulator 28 to automatically stop receiving stock material from the direction of the reel 24, but to continue to feed accumulated stock material out to the presses 20, 22. Thus, some of the accumulated stock material in the accumulator 28 begins to be used. The second reel 26 of stock material is placed in position and a leading edge portion (not shown) is let out from the roll L2 on the second reel 26 to adjacent the trailing edge portion (not shown) of the prior roll L1 of stock material. The leading and trailing edges may be cut as necessary to form a good joint between the two rolls L1, L2. The welder 42 is moved on the tracks 44 into line with the path of the web W (as shown in FIG. 1) and the leading edge of the new roll L2 of stock material is welded to the trailing edge of the prior roll L1 of stock material. The accumulator 28 is then activated to draw in stock material in the web W at a rate faster than it is let out from the accumulator to make up for the reduction in accumulated material let out to the presses 20, 22 during the changeover to the new roll L2 of stock material. Thereafter, the accumulator resumes normal operation in which stock material is fed out at the same rate it is received from the reel 26. In this way, operation of the tandem presses to form stator and rotor cores is not interrupted by changeover to the new roll L2 of stock material.

The first web control means 30 includes a web guide 50, web straightener 52 and a first vertical loop stand, generally indicated at 54. The straightener 52 is of conventional construction, including a plurality of feed rollers over which the web W is fed along a generally S-shaped path to flatten the web which carries the memory of its prior rolled condition to the straightener. The straightener 52 is capable of feeding out stock material at a slightly higher speed than it is consumed in the rotor press 20, and is automatically adjustable to attempt to match the speed with which stock material is fed into the rotor press. The web W proceeds from the straightener 52 to a first leg 56 of the first vertical loop stand 54 which guides the web upward to a second leg 58 which guides the web downward and toward the rotor press 20. Between the legs 56, 58 the web W has an inverted-U shaped section which increases and decreases in height as the amount of material between the legs changes. Thus, the first vertical loop stand 54 controls the web W while permitting variations in speed between the stock material in the web as it enters and exits the first vertical loop stand.

As the web W exits the first vertical loop stand 54 it passes through a measuring unit 60 which constantly measures the thickness of the stock material. Information as to the thickness of the stock material is used by the controller 40 to increase or decrease the number of rotor and stator laminations R, L stacked to form rotor and stator cores so that the correct heights of the rotor and stator cores are achieved. In addition, the controller 40 is capable of changing the number of laminations R, L in the rotor and stator cores according to instructions previously entered into the controller about the run. For instance, a particular run may call for a certain number of rotor and stator cores of a first height and a certain number having a second height different from the first. The controller 40 is capable of controlling the rotor and stator presses 20, 22 to shift from forming rotor and stator cores of one height to that of another without any pause in operation of the tandem press system.

The rotor press 20 includes a frame having a base 64, a crown portion 66 and posts 68 extending up from the base and supporting the crown portion above the base. The rotor press 20 holds a die set including an upper die portion 70 and a lower die portion 72. The lower die portion 72 is mounted on a bolster 74 supported on a bed member 76 of the rotor press 20, and supports the web W as it passes through the rotor press. The upper die portion 70 is mounted on a slide 78 that is driven in reciprocation in the space between the crown portion 66 and bed member 76 by operation of an electric drive motor 80. A feed device 82 mounted on the rotor press frame receives stock material in the web W from the first vertical loop stand and feeds it into the rotor press 20. The feed device 82 feeds stock material intermittently, interrupting feed during the working stroke of the rotor press 20 when the die set closes and feeding stock material when the die set is open.

Figure 3B:
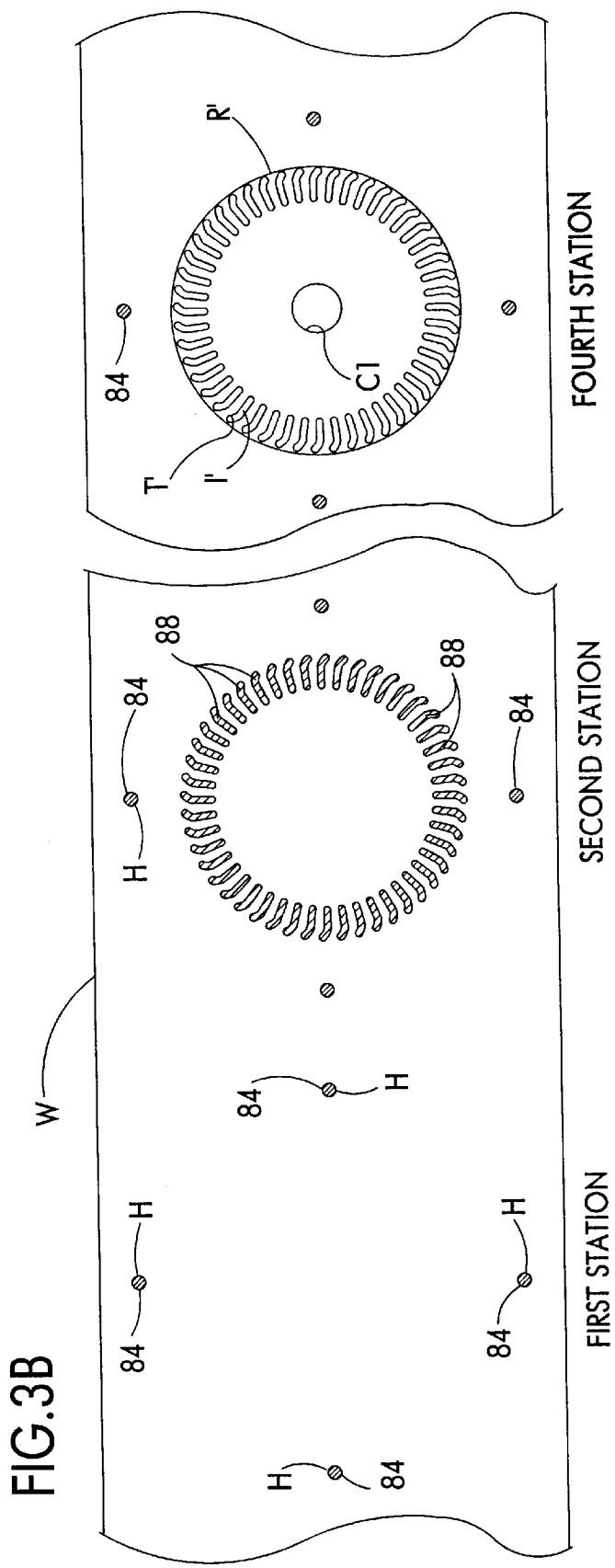
FIG. 3B is a schematic illustration of the progression of formation of rotor laminations at the first, second and fourth stations of the rotor press and illustrating a second configuration of the rotor laminations.

The progressive formation of a rotor lamination R of a first type in the rotor press 20 is illustrated schematically by the portion of the web W shown in FIG. 3A of the drawings. At a station in the rotor press 20 which is not illustrated in FIG. 3A, four locator holes H are punched. These holes H are used at later stations in the rotor press 20 and stator press 22 to positively locate the web W using locator pins 84 associated with each operating station. At the first station in the rotor press 20, punches 86 carried by the upper die portion 70 (shown by cross hatching in FIG. 3A) stamp a series of slots I having angled toe portions T at their radially outer ends. As seen in FIG. 3A, the toe portions T of the slots I in a rotor lamination R of the first type are angled in a counterclockwise direction. Punches 88 at the second station (shown by cross hatching in FIG. 3B) are inactive during formation of the first type of rotor lamination R so that no further formation of the rotor lamination occurs at the second station.

Similarly the punches (not shown) at the third station are inactive unless the rotor lamination being formed will be the bottom or first lamination in a new stack of laminations forming a rotor core. In that event, a punch at the third station is active to simultaneously punch the outer perimeter of the lamination and a center opening C1 of the lamination, as shown in phantom in FIG. 3A. In addition, four rectangular openings O1 would be formed at the third station to prevent the rotor lamination R from interlocking with the top lamination of the prior stack. However, in most instances the outer perimeter and center opening C1 are punched by punch 90 at the fourth station as shown in solid lines. In addition, four interlock openings O2 are formed at the fourth station. These openings O2 are punched through, but unlike the openings O1 the stock material is not removed from the rotor lamination, but remains to form tabs (not shown) which fit into the opening O2 of an adjacent lamination in the rotor core stack to interlock the laminations in the stack. The details of lamination interlocks are well known to those of skill in the art. The rotor lamination R, although now separated from the web W, is carried by the web to the fifth station where it is pushed by punch 91 into a barrel 92 (illustrated in phantom in FIG. 3A). The barrel 92 is rotated between each working stroke of the rotor press 20 so that slight variations in material thickness over the rotor laminations R and deviations of the laminations and their center openings C1 are substantially cancelled out over the stack of laminations forming a rotor core. In this way, highly accurate rotor cores are produced.

The rotor core is formed by a stack of rotor laminations R of the first type (described above) and rotor laminations R' of a second type. In a preferred embodiment, the rotor core is formed by a stack including two sets of rotor laminations of one type (R or R') with one set of rotor laminations of the other type disposed between them. The web W at the first, second and fourth stations of the rotor press 20 during formation of rotor laminations R' of the second type is shown in FIG. 3B. To form rotor laminations R' of the second type, the punches 86 at the first station are inactive, and the now active punches 88 at the second station form slots I' with toe portions T' angled in a clockwise direction (i.e., in a direction opposite the toe portions of rotor lamination slots of the first type). A rotor core is formed by stacking at least one set of rotor laminations R of the first type and another set of rotor laminations R' of the second type. This compound formation of the rotor core produces an alignment of slots I, I' defining passages (not shown) through the length of the rotor core which are partially skewed as a result of the toe portions T, T'. These passages are later filled with an electrically conductive material to form induction bars of the rotor core. A more detailed description of the rotor core so formed may be found in co-assigned U.S. application Ser. No. 08/139,578, filed Oct. 20, 1993, the disclosure of which is incorporated herein by reference. However, it is to be understood that the rotor press 20 need not be configured to from rotor cores using a straight skew design as described above to fall within the scope of the present invention. It is envisioned that the die set in the rotor press 20 could be configured to stamp rotor indication bar slots of a single type and achieve a spiral skew by rotation of each lamination in the stack relative to the adjacent laminations.

As shown in FIG. 4, the lower die portion 72 of the rotor press 20 includes a main body 94 having an opening 96 for ejection of scrap punched from the web W. A first insert 98 is received in recess in the main body 94 and underlies a second insert 100 received in a die member 102 mounted on the upper surface of the main body. Web guides 104 secured to the die member 102 at laterally spaced apart locations guide the web W through the rotor press 20. The second insert 100 has a plurality of holes in which are received third inserts 106 having openings shaped in the form of the rotor lamination slots I of the first type. These openings receive the tips of the punches 86 at the bottom of the working stroke of the rotor press 20 and define the surface against which the web W is punched to form the slots I. The third insert 106 is made of carbide and forms the cutting surface of the lower die portion 72.

The upper die portion 70 at the first station in the rotor press 20 carries a plurality of the punches 86 (only two of which are shown) secured to a guide plate 108 by a generally circular retainer plate 110. The retainer plate 110 is received at its periphery in notches in each punch 86 and secured to the guide plate 108 by bolts (not shown). A bridge stripper 112 is secured by clamps (not shown) to the main body 94 on top of the web guides 104, and has through holes which receive the distal end portions of the punches 86. The bridge stripper 112 holds down the web W and removes it from the punches 86 after each working stroke of the rotor press 20. The bridge stripper 112 is advantageous in that it is not mounted on the upper die portion 70, and therefore does not add its mass to the inertia of the upper die portion. However, it is envisioned that other types of strippers, such as spring strippers (not shown) could be used and still fall within the scope of the present invention. The guide plate 108 is mounted on a backing plate 116 received in a recess in a main body 118 of the upper die portion 70 and engaging the upper ends of the punches 86. The backing plate 116 is secured in the recess by bolts 120 and lugs 122 (only one set is shown). A guide pin 124 is received through the main body 118, backing plate 116 and guide plate 108 for maintaining the proper alignment between these elements. The guide pin 124 is received in a bushing 126 in the backing plate 116 which permits vertical movement between the guide plate and the main body 118. A pusher bar 128 supported on a spring (schematically indicated at 130) in a hole in the main body 94 of the lower die portion 72 extends upward through the die member 102 and bridge stripper 112. The pusher bar 128 engages the guide plate 108 only at near the bottom of the working stroke of the rotor press 20. The pusher bar 120 and spring 130 prevent the punches 86 from engaging the web W when the first station is inactive, as described more fully below.

Activation and de-activation of the punches 86, 88 forming the slots I, I' of the first and second types respectively in the rotor laminations R, R' is achieved without interruption of the operation of the rotor press 20. A reaction surface member 132 is mounted in the main body 118 of the upper die portion 70 for sliding motion laterally of the backing plate 116 by operation of a pneumatic cylinder 134 carried by the main body and connected to the reaction surface member by link bar 136. The reaction surface member 132 has a plurality of teeth 138 on its bottom surface which, when the reaction surface member is in the punch position (as shown in FIG. 4), are in registration with and engage similarly formed teeth 140 on the upper surface of the backing plate 116. The reaction surface member 132, when in the punch position shown in FIG. 4, holds the backing plate 116, and hence the punches 86, from vertically upward motion relative to the main body 118. Thus when the punches 86 strike the web W, slots I of the first type are formed in the web. However, if the cylinder 134 is activated to rapidly slide the reaction surface member 132 to a release position so that the teeth 138, 140 of the reaction surface member and backing plate 116 move out of registration, the backing plate and punches 86 will move up under the urging of spring 130 and pusher bar 128 on the working stroke. The teeth 140 on the backing plate are received between the teeth 138 on the reaction surface member 132. Slots I will not be formed and the first station becomes inactive. More specifically, when it is desired to form induction bar slots I' of the second type, the reaction surface member 132 is moved to the release position thereby rendering the first station of the rotor press 20 inactive. Simultaneously, a substantially identical reaction surface member (not shown) at the second station is moved to the punch position to activate the second station. The changeover from active punching at the first station to active punching at the second station occurs within one stroke of the rotor press 20 so that there is no interruption in reciprocation of the press. The selective operation of the punch (not shown) at the third station and punch 90 at the fourth station is achieved with substantially the same structure as described above for the first station.

The web W exiting the rotor press 20 passes through a second vertical loop stand (indicated generally at 142) having a first leg 144 and a second leg 146. As shown in FIG. 5, each leg 144, 146 has web path defining members 148, made of nylon or other suitable low-friction material, which guide the web W along a path which does not extend back upon itself. More specifically, the portion of the web W in the second vertical loop stand 142 (broadly, "holding apparatus") assumes a generally inverted-U shape which helps to inhibit creasing of the stock material in the web caused by folding of the stock material back upon itself as a result of the vibrations introduced to the web by the intermittent feed of the web and the high speed reciprocation of the rotor press 20.

However, it has been found that in vibrations introduced by the high speed operation of this tandem press system can still cause creases in the stock material. Between the first and second legs 144, 146 is a generally rectangular spring steel member 150 which is fixedly attached at one end 150A to the first leg and attached to the second leg at its opposite end 150B for vertical sliding motion relative to the second leg. The web W passes over and is supported by the spring steel member 150 between the legs 144, 146. The spring steel member 150 permits the top of the loop of the web W in the second vertical stand 142 to move up and down while tending to hold the top of the loop in a smooth, inverted-U form. The spring steel member 150 increases or decreases its length between the first and second legs 144, 146 by the sliding action of the end 150B of the member slidably connected to the second leg. To increase the ability of the spring steel member 150 to follow the rapid movements of the web W, a pair of cylindrical rollers 152 extending transversely of the web engage the underside of the spring steel member. The rollers 152 are mounted at each end in a vertical slot 154 in a frame 156 mounted between the first and second legs 144, 146. The ends of each roller 152 are each connected to one end of a spring 158, the other end of which is connected to the nearest of the first and second legs 144, 146. Only one of the two springs 158 is shown for each roller in FIG. 5. The spring mounted rollers 152 bias the spring steel member 150 generally upwardly, permitting it to react quickly with the movements of the web W to maintain engagement with the web and to hold it in its smooth, inverted-U shape between the legs 144, 146 of the stand 142.

As it leaves the second vertical loop stand 142, the web W is still subject to substantial vibratory action as a result of the rotor press 20. In order to maintain control of the web W to a degree needed for operations on the web in the stator press 22, a web straightener 160 located after the second vertical loop stand 142 provides a barrier to propagation of vibrations in the web to the stator press (FIG. 2). The straightener 160 firmly grips the web W to substantially reduce the vibrations. The straightener 160 is not used in this context for its ordinary function of removing a prior configuration of the web W retained in its elastic memory. Although a straightener 160 has been found to provide a satisfactory barrier to vibrations, it is envisioned that other mechanisms which firmly grip the web W could be used without departing from the scope of the present invention.

As shown in FIG. 2, the stator press 22 includes a frame comprising a base 161, a crown portion 162 and posts 163 extending up from the base and supporting the crown portion above the base. The stator press holds a die set including an lower die portion 178 and an upper die portion 180. The lower die portion 180 is mounted on a bolster 165 supported on a bed member 167 of the stator press, and supports the web W as it passes through the stator press 22. The upper die portion 180 is mounted on a slide 169 that is driven in reciprocation in the space between the crown portion 162 and the bed member 167 by operation of an electric drive motor 171. A feed device 173 mounted on the stator press frame receives stock material in the web W from the web straightener 160 and feeds it to the stator press 22. The feed device 173 feeds stock material intermittently, interrupting feed during the working stroke of the stator press 22 when the die set closes, and feeding stock material when the die set is open.

Referring now to FIG. 6, a progression of the web W through the stator press 22 for forming a stator lamination S for a two speed motor is shown. At the first station, stator slot deepening punches 164A (illustrated by cross hatching in FIG. 6) stamp a generally semi-circular array of openings in the web W around a central opening C2 in the web W left by formation of the rotor laminations R, R'. At the second station, other stator slot deepening punches 164B stamp an opposing generally semi-circular array of openings. Together, the two semi-circular arrays of punches 164a, 164B constitute "the second set" of punches in this embodiment. One speed stator slot punches 166 (e.g., a "first set" of punches) at the third station form slots in the web W around the central opening sufficient to accommodate the windings of a one speed motor. However, the openings stamped by the slot deepening punches 164A, 164B deepen certain of these slots so that slots A needed to accommodate the windings for a two speed motor are formed. The locator holes H previously formed in the rotor press 20 are subsumed within certain slots formed by the one speed slot punches. The slots A are not entirely completed at the third station as they do not yet open into the central opening C2 of the stator lamination S.

The fourth station is activated only for punching rectangular openings O3 in the bottom stator lamination of each stator core formed in the stator press 22. The openings O3 are punched clean (just as openings O1 in the rotor laminations R, R') so that the top stator lamination in the prior stator core which not interlock with the bottom stator lamination of the new stator core. The slots A are opened to the central opening C2 at the fifth station by a center opening punch 169 at the same time recesses are formed by corner punches 170 at the four corners of the lamination S which will form a channel receiving a fastener (not shown) which connects the stator laminations together. If the fourth station is inactive, the interlock punches (not shown) at the fifth station punch openings O4 and interlock tabs which are received in openings O4 of adjacent stator laminations in the stack to interlock the laminations. The sixth station is idle because of space requirements in the stator press 22 for the fifth station and the seventh station. The stator lamination S is punched away from the web W at the seventh station and into a barrel 174 (shown in phantom) similar to the barrel 92 of the rotor press 20. The rotation of the barrel 174 is controlled by a mechanical indexer (not shown) connected to the barrel by a cogged belt 176 for rotating the barrel 90° after each lamination S is deposited into the stack forming the stator core in the barrel. The mechanical indexer is preferably model 17D-0227-2 mechanical indexer manufactured by Sankyo of Japan and available in this country through Sankyo America, Inc. of Sidney, Ohio.

Figure 7:
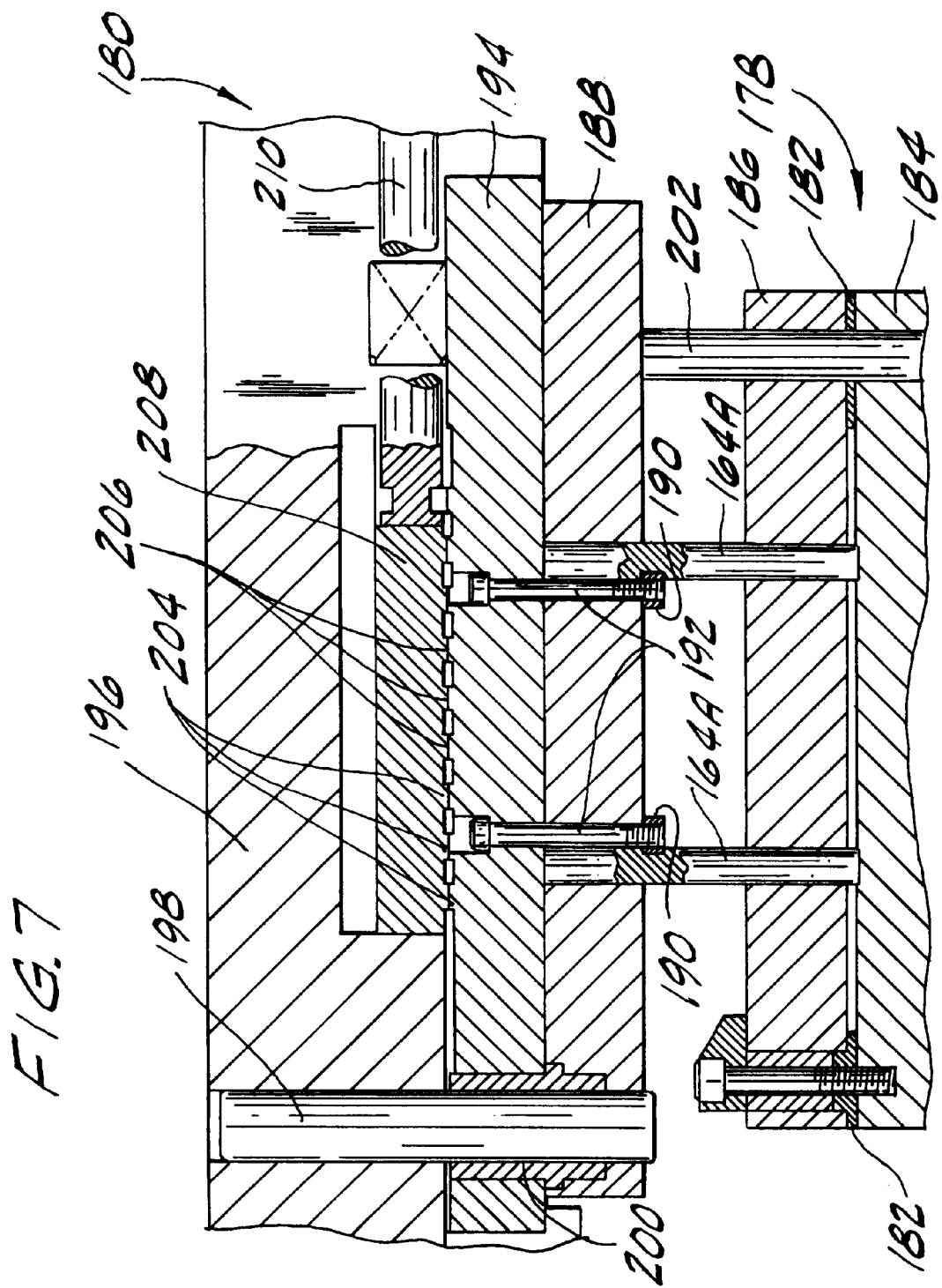
FIG. 7 is a fragmentary, partial transverse section of a die set of the stator press showing a movable reaction surface of an upper die portion of the die set.

The formation of one speed motor stator laminations (not shown) is substantially the same as described for formation of two speed motor stator laminations S, except that the slot deepening punches 164A, 164B at the first two stations are inactive. As shown in FIG. 7, this is accomplished in a way substantially identical to the deactivation of punches 86 in the rotor press 20. In that regard, the stator press 22 has a die set including a lower die portion 178 adapted to support the web W as it passes through the stator press, and an upper die portion 180 mounted for reciprocating motion above the lower die portion. Web guides 182 mounted on an upper surface of a main body 184 of the lower die portion 178 guide the web W through the stator press 22. A bridge stripper 186 secured to the main body 184 and located above the web guides 182 holds the web W in place and strips the web off the punches 164A (only two of which are shown) after the end of the working stroke of the stator press 22.

Openings in the bridge stripper 186 receive the lower ends of the slot deepening punches 164A and permit access of the punches to the web W. The upper ends of the punches 164A are received in a guide plate 188 and held therein by lugs 190 received in notches in the punches 164A and attached by bolts 192 to a backing plate 194. The backing plate 194 is mounted on a main body 196 of the upper die portion 180 above the punches 164A. A first guide pin 198 passing through the main body 196, backing plate 194 and guide plate 188 maintains alignment between these elements of the upper die portion 180. The first guide pin 198 is received in a bushing 200 the backing plate 194 to permit vertical motion of the backing plate relative to the bushing and main body 196. A second guide pin 202 depends from the guide plate 188 and passes through the bridge stripper 186 and main body 184 of the lower die portion 178, thereby maintaining an alignment between these elements of the die set.

The upper surface of the backing plate 194 is formed with teeth 204 which, as shown in FIG. 7, are in registration with and engaging teeth 206 formed on the lower surface of a reaction surface member 208 above the backing plate. The reaction surface member 208 is mounted in the main body 196 for sliding motion laterally of the body above the backing plate 194. The motion is powered by a cylinder (not shown, but substantially identical to cylinder 134 of the rotor press 20) connected to the reaction surface member by a link bar 210. The controller 40 is capable of operating the cylinder for movement of the reaction surface member 208 between a punch position in which the teeth 204, 206 of the backing plate 194 and reaction surface member are in registration (as shown in FIG. 7) and a release position in which the teeth 204, 206 of the backing plate and reaction surface member are out of registration. In the punch position, the reaction surface member 208 holds the backing plate 194 and rigidities the punches 164A for punching through the web W at the bottom of the working stroke of the stator press 22. In the release position, the backing plate 194 and punches 164A are permitted to move upward upon engagement with the stock material in the web W so that no openings are formed in the web. The teeth 204 of the backing plate 194 are received between the teeth 206 of the reaction surface member 208. The change in from the punch position to the release position occurs within a single stroke of the stator press 22 so that there is no interruption in operation of the press when changing from forming one speed stator laminations to two speed stator laminations S. Thus, not only is there no requirement for changing the die set in the stator press 22 to form stator laminations for different speed motors, there is not even any interruption in the operation of the stator press.

Rapid operation of the tandem press system (i.e., in excess of 400 strokes per minute) produces vibrations in the web W by the rapid impact and release of the stator and rotor press upper die portions 70, 180, and also produces undesirable jerking in the web caused by the intermittent feed of the web to the presses 20, 22 by the feed devices 60, 173. To reduce jerking of the web W caused by rapid starts and stops because of the intermittent feed, controller 40 operates press 20 and stator press 22 at substantially the same speed and out of phase with each other. Thus, the feeding cycles for each press are different giving the web W a smoother travel through the presses. More specifically, the rotor press 20 is set to run out of phase and ahead of stator press 22 by about 65° to 85° (based on a 360° mechanical cycle). More preferably, the phase difference is set to be between about 70° and 80°, and most preferably at about 70°. The phase differential is achieved by electronically presetting the top stop position of each press.

Rapid operation of the rotor and stator presses 20, 22 also requires careful monitoring of the relative speed of the presses so that the proper speed synchronization is maintained. Of course, it is to be understood that the rotor press 20 and stator press 22 desirably operate out of phase, but that it is important to synchronize their operations at the selected out of phase condition. In other words, synchronizing the presses 20 and 22 is defined as operating the presses at substantially the same speed and out of phase at a preselected angle. Maintenance of synchronization is particularly difficult when the presses are accelerating as during start up of the tandem press system. The controller 40 has start up means (in this embodiment a dedicated hardwired logic circuit within controller 40) for controlling start up of the presses 20, 22. The start up means may also be implemented by software or in the form of a programmable logic array (PLA). The start up means of controller 40 executes the flow chart of FIG. 8. Initially, at step 220, the start up means activates reciprocation of the presses. Next, step 222 is executed to accelerate the presses toward a preselected full operating speed at a first controlled acceleration rate. During this initial ramp up, a comparator within the start up means executes step 224 and compares the speed signal of the stator press 22 to the speed signal of the rotor press 20 and a signal is generated to increase or decrease the speed of the stator press as needed to maintain synchronization.

At a plateau value (e.g., 140 strokes per minute) the start up means in the controller 40 halts the acceleration of the rotor press 20 and stator press 22 for a predetermined period of time to permit the start up means to substantially converge and synchronize the speeds of the rotor press and stator press. In the preferred embodiment, a dwell of approximately 45 seconds is satisfactory to reestablish synchronization. Start up means executes step 228 to determine if the plateau value has been reached. If the speed of both presses is below the plateau value, the start up means returns to step 222 and continues acceleration. If the speed of either press is above the plateau value, loop 230 is executed to discontinue further acceleration until the presses are resynchronized. At step 232, a dwell timer is started to time the dwell period during which the acceleration will be discontinued. Steps 234 and 236, which correspond to steps 224 and 226, continue to be executed as part of loop 230. In addition, step 238 is executed at the end of each loop 230 to determine if the dwell timer has timed out or equals the dwell period. If it has not, loop 230 is again executed.

When the dwell timer equals or exceeds the dwell period, start up means executes step 240 to reaccelerate the reciprocation from the plateau speed at a second controlled acceleration rate (e.g., 100 strokes per minute$^2$) slower than the first controlled acceleration rate to achieve the full desired operating speed. At steps 242 and 244, the start up means continues to compare the speeds of the presses and make corresponding speed and phase changes to maintain synchronization as long as the tandem press system is in operation. If the full operating speed is achieved, the start up means returns to step 242 to continue speed and phase control. If the full operating speed is not achieved, the start up means returns to step 240 to continue reacceleration as well as speed and phase control.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A method for high speed formation of stator laminations for use in a dynamoelectric machine from a web of steel material, the method comprising the steps of:

delivering the web of material to the stator press;

activating a set of slot-deepening punches in the stator press die to stamp slot-deepening openings in the web, the slot deepening openings being spaced apart with none of the slot-deepening openings intersecting any of the other slot-deepening openings;

stamping primary slots in the web with another set of punches carried by the stator press die, selected ones of said primary slots communicating with corresponding ones of the slot-deepening openings, to form slots of the stator lamination, the slots being sized and shaped for receiving windings of the dynamoelectric machine.

2. A method as set forth in claim 1 wherein said primary slots, as unmodified by the openings, are sized and shaped to receive the windings of an electric motor having a first number of speeds, and wherein the slots formed by the primary slots, including those communicating with the slot-deepening openings, are sized and shaped for receiving the windings of an electric motor having a second number of speeds different from the first.

3. A method for high speed, selective formation of stator laminations for a stator core of a motor having a first number of speeds and stator laminations for a stator core of a motor having a second number of speeds different from the first, the stator laminations being stamped from a web of highly permeable magnetic material, the method comprising the steps of:

delivering the web of magnetic material to a reciprocating stator press;

providing a first set of punches fixed in a die of the stator press for stamping a generally circular array of first slots around a center of the lamination on every working stroke of the stator press, the first slots extending generally radially outwardly from the center, any stator lamination formed with the first slots being capable of receiving in the first slots windings for the motor having the first number of speeds;

selectively activating and deactivating a second set of punches in the stator press die without interrupting the reciprocating motion of the stator press, the second set of punches, when activated, stamping slot-deepening openings in the web, at least some of the first slots communicating with the slot-deepening openings to form elongated slots to produce stator laminations capable of receiving windings for the motor having the second number of speeds, the second set of punches, when deactivated, refraining from stamping the slot-deepening openings so that the stator press produces stator laminations capable of receiving the windings of the motor of the first number of speeds.

4. A method as set forth in claim 3 wherein the step of selectively activating the second set of punches occurs before the first slots are stamped in the web.

5. A method as set forth in claim 3 wherein the step of activating the second set of punches is carried out by an electronic control circuit preprogrammed with customer orders for motors having the first number of speeds and motors having the second number of speeds, the electronic control circuit activating and deactivating the second set of punches without interruption or slowing down reciprocation of the stator press to produce stator laminations for motors having the first number of speeds and stator laminations of motors having the second number of speeds.

6. A method as set forth in claim 3 wherein the step of activating the second set of punches comprises the step of activating a cylinder to move a reaction surface member on the stator press die between a punch position in which the reaction surface member holds said second group of punches for punching through the web of material and a release position in which the reaction surface member releases said second set of punches to prevent punching through the web.

* * * * *